United States Patent

Gysling et al.

(10) Patent No.: US 8,862,411 B2
(45) Date of Patent: Oct. 14, 2014

(54) VELOCITY AND IMPINGEMENT METHOD FOR DETERMINING PARAMETERS OF A PARTICLE/FLUID FLOW

(75) Inventors: Daniel L. Gysling, Glastonbury, CT (US); Warren Sneedon, Katy, TX (US)

(73) Assignee: Expro Meters, Inc., Wallingford, CT (US)

( * ) Notice: Subject to any disclaimer, the term of this patent is extended or adjusted under 35 U.S.C. 154(b) by 1522 days.

(21) Appl. No.: 12/197,748

(22) Filed: Aug. 25, 2008

(65) Prior Publication Data

US 2009/0055104 A1 Feb. 26, 2009

Related U.S. Application Data

(60) Provisional application No. 60/957,828, filed on Aug. 24, 2007.

(51) Int. Cl.
| | | |
|---|---|---|
| *G01F 1/00* | (2006.01) | |
| *G01F 1/78* | (2006.01) | |
| *G01F 1/708* | (2006.01) | |
| *G01F 1/74* | (2006.01) | |
| *G01F 1/32* | (2006.01) | |
| *G01F 1/20* | (2006.01) | |

(52) U.S. Cl.
CPC .. G01F 1/74 (2013.01); G01F 1/78 (2013.01); *G01F 1/3263* (2013.01); G01F 1/7082 (2013.01); *G01F 1/206* (2013.01)
USPC ............... 702/25; 702/45; 702/50; 702/100; 732/23.33; 732/53.04; 732/61.73

(58) Field of Classification Search
USPC ........... 702/25, 100, 45, 50; 73/53.04, 61.73, 73/23.33
See application file for complete search history.

(56) References Cited

U.S. PATENT DOCUMENTS

| | | | |
|---|---|---|---|
| 5,641,915 A | | 6/1997 | Ortiz et al. |
| 6,040,586 A | * | 3/2000 | Slettnes ........................ 250/573 |
| 6,109,097 A | | 8/2000 | Conrads et al. |
| 6,481,288 B1 | | 11/2002 | Humphrey et al. |
| 6,550,345 B1 | | 4/2003 | Letton |
| 6,609,069 B2 | | 8/2003 | Gysling |
| 6,634,239 B2 | | 10/2003 | Gomm et al. |
| 6,837,098 B2 | | 1/2005 | Gysling et al. |
| 6,889,562 B2 | | 5/2005 | Gysling et al. |
| 7,028,538 B2 | | 4/2006 | Gysling et al. |
| 7,032,432 B2 | | 4/2006 | Gysling et al. |

(Continued)

FOREIGN PATENT DOCUMENTS

| | | |
|---|---|---|
| DE | 4306119 | 9/1994 |
| GB | 2210169 | 6/1989 |
| WO | 9314382 | 7/1993 |

*Primary Examiner* — Sujoy Kundu
*Assistant Examiner* — Paul D Lee
(74) *Attorney, Agent, or Firm* — O'Shea Getz P.C.

(57) ABSTRACT

A method and apparatus for determining at least one flow parameter of a fluid flowing within a pipe, which fluid contains particles entrained within the fluid flow is provided. The method includes the steps of: 1) determining a velocity of the fluid flow within the pipe; 2) sensing the impingement of particles on a surface wetted with the fluid flow, and producing a signal relating to the impingement; and 3) determining the at least one flow parameter of the fluid flow utilizing the determined fluid flow velocity and the sensor signal relating to impingement of the particles on the surface wetted with the fluid flow.

17 Claims, 4 Drawing Sheets

(56) References Cited

U.S. PATENT DOCUMENTS

| | | |
|---|---|---|
| 7,096,719 B2 | 8/2006 | Gysling |
| 7,181,955 B2 | 2/2007 | Gysling |
| 7,237,440 B2 | 7/2007 | Gysling et al. |
| 7,261,002 B1 | 8/2007 | Gysling et al. |
| 7,275,421 B2 | 10/2007 | Gysling |
| 7,322,245 B2 | 1/2008 | Gysling et al. |
| 7,330,797 B2 | 2/2008 | Bailey et al. |
| 7,331,233 B2 | 2/2008 | Scott |
| 7,337,075 B2 | 2/2008 | Gysling et al. |
| 7,340,353 B2 | 3/2008 | Gysling et al. |
| 7,359,803 B2 | 4/2008 | Gysling et al. |
| 7,363,800 B2 | 4/2008 | Gysling |
| 7,389,187 B2 | 6/2008 | Kersey et al. |
| 7,389,687 B2 | 6/2008 | Gysling et al. |
| 7,400,985 B2 | 7/2008 | Fernald et al. |
| 2005/0077463 A1* | 4/2005 | Small et al. .................. 250/288 |
| 2005/0125170 A1* | 6/2005 | Gysling et al. .................. 702/48 |
| 2007/0027638 A1* | 2/2007 | Fernald et al. .................. 702/25 |

\* cited by examiner

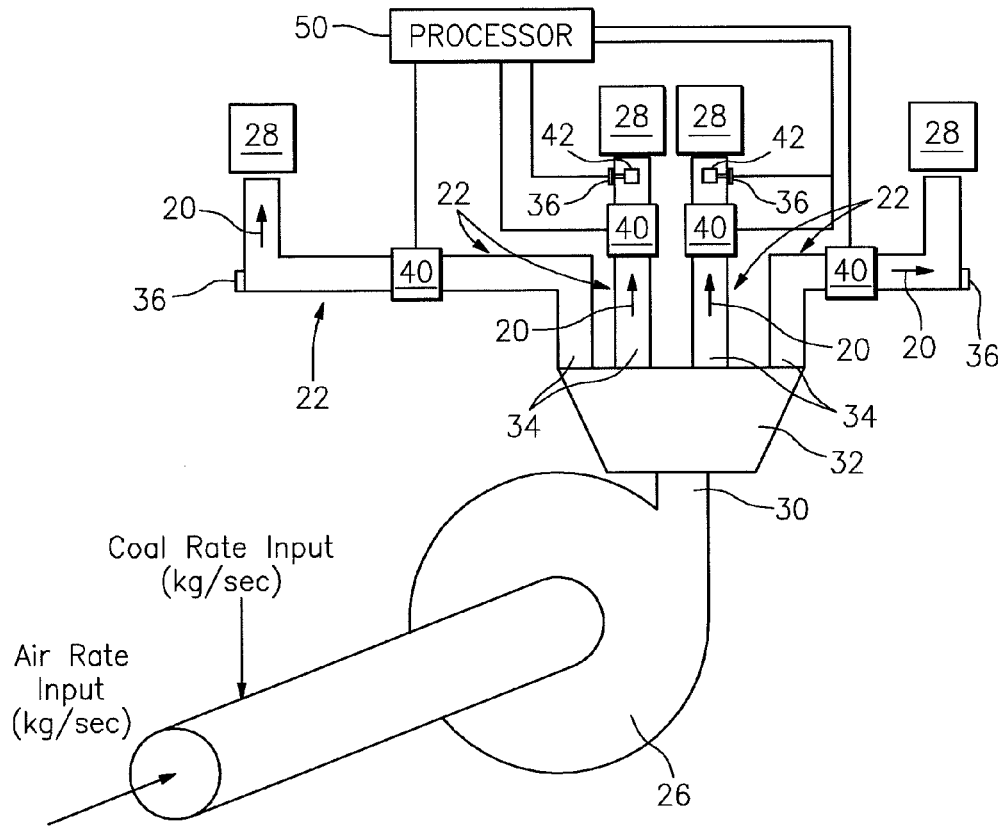
FIG. 1
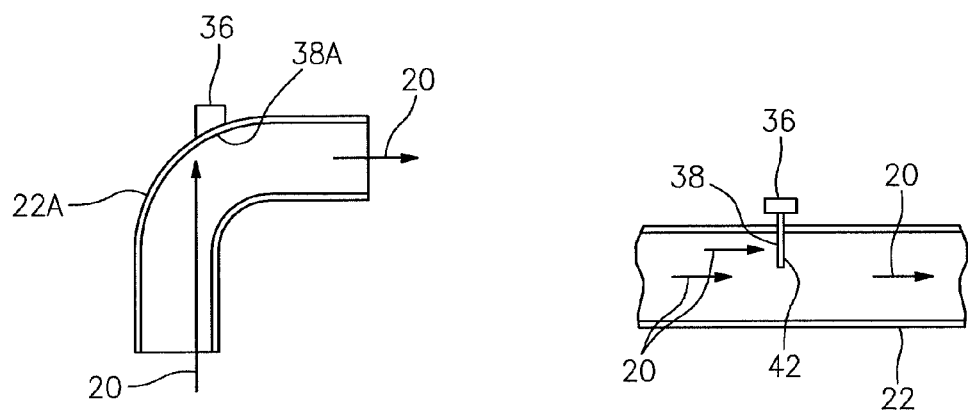
FIG. 4
FIG. 5

VELOCITY AND IMPINGEMENT METHOD FOR DETERMINING PARAMETERS OF A PARTICLE/FLUID FLOW

CROSS-REFERENCE TO RELATED PATENT APPLICATIONS

This application claims the benefit of U.S. Provisional Patent Application No. 60/957,828 filed Aug. 24, 2007, which is hereby incorporated by reference herein in its entirety.

BACKGROUND OF THE INVENTION

1. Technical Field

This invention relates to methods and systems for determining flow parameters of a fluid flow within a pipe in general, and to methods and systems for determining flow parameters of fluid flow having entrained solid particles in particular.

2. Background Information

The ability to accurately provide information regarding a fluid flow within a pipe, which flow contains entrained solid particles, can provide great advantage in several different technology areas. For example, the ability to accurately measure the flow rate and composition of an air/coal mixture within a coal fired power plant provides great advantage for efficient operation of the plant. Similarly, the ability to accurately detect the presence of a particulate such as sand within an oil/gas well application, and measure the flow rate and composition of an oil/water/gas/sand mixture within the well pipe also provides great advantage. Sensing the presence of the sand gives the operator the chance to adjust the drilling/pumping techniques used to minimize the entrainment of sand.

A ClampOn™ meter is a prior art device that can be used to continuously monitor a well for sand production. This type of meter, which can be clamped onto an elbow of a pipe, uses ultrasonic detection methods to detect sand impacting the pipe wall. Sand (or other particle matter) impacting the wall creates a "blind" signal that in fact is a function not only of particle mass flow, but also flow velocity. Hence, a variation of the sensor signal may be related to a change in the particle mass flow rate, or may be a function of a change in flow velocity, or both.

What is needed is a method and apparatus that can be used to accurately provide information regarding a fluid flow within a pipe, which flow contains entrained solid particles. In addition, it would be highly advantageous to provide such a method and apparatus, and one which can be used in many different technical applications; e.g., chemical, pharmaceutical, petroleum and power generation applications.

SUMMARY OF THE INVENTION

According to the present invention, a method is provided for determining at least one flow parameter of a fluid flowing within a pipe, which fluid contains particles entrained within the fluid flow, the method comprising the steps of: 1) determining a velocity of the fluid flow within the pipe; 2) sensing the impingement of particles on a surface wetted with the fluid flow, and producing a signal relating to the impingement; and 3) determining the at least one flow parameter of the fluid flow utilizing the determined fluid flow velocity and the sensor signal relating to impingement of the particles on the surface wetted with the fluid flow.

According further to the present invention, a system for determining at least one parameter of a fluid flow containing particles entrained within the flow, which flow is disposed within a pipe, is provided. The system comprises at least one meter operable to determine the velocity of the fluid flow within the pipe, at least one sensor operable to produce a signal relating to the entrained particles impinging on a surface wetted with the fluid flow, and a processor operable to selectively determine the at least one parameter of the fluid flow utilizing the meter output and the sensor signal relating to the particles impinging on the surface wetted with the fluid flow.

One of the advantages of the present invention is that it provides a method and apparatus that can be used to accurately provide information regarding a fluid flow within a pipe, which flow contains entrained solid particles.

The foregoing features and advantages of the present invention will become more apparent in light of the following detailed description of exemplary embodiments thereof.

BRIEF DESCRIPTION OF THE DRAWINGS

FIG. 1 is a schematic diagram of an embodiment of an apparatus operable to practice the present invention method, which apparatus is applied to a diagrammatic piping system.

FIG. 4 is a diagrammatic view of an elbow pipe section with a sensor disposed to sense particles impinging on a pipe wall surface.

FIG. 5 is a diagrammatic view of a pipe section with a sensor in communication with a body disposed within the fluid flow to sense particles impinging on the body.

DETAILED DESCRIPTION OF THE INVENTION

Figure 2:
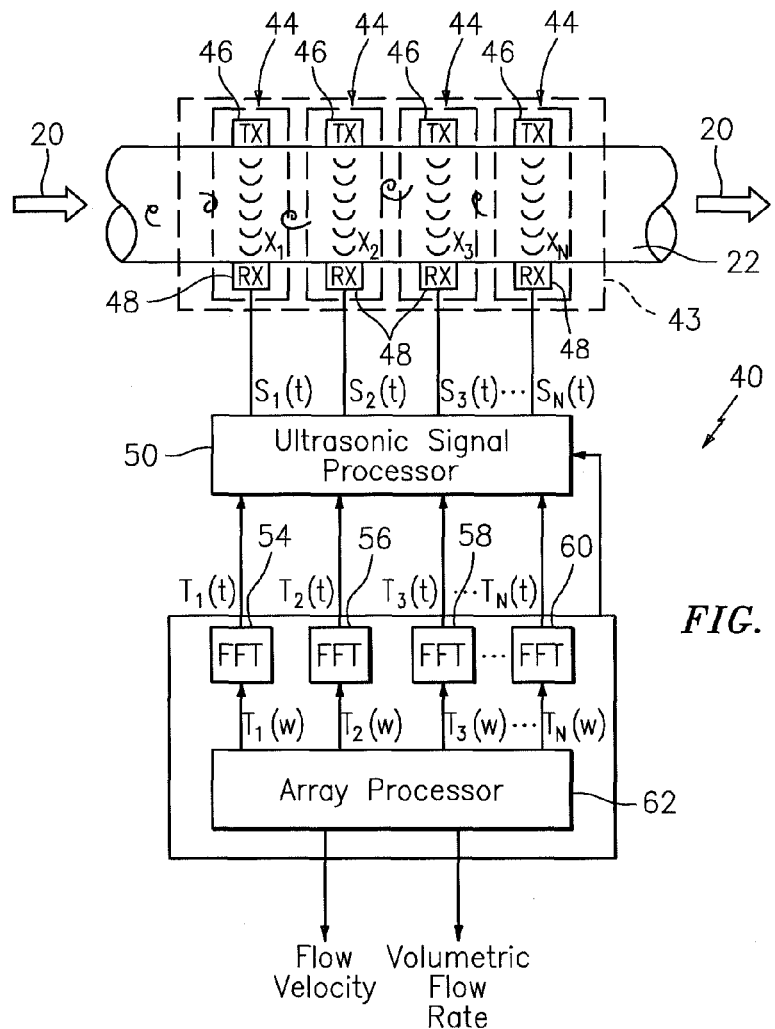
FIG. 2 is a schematic diagram of an embodiment of an apparatus operable to practice the present invention method, including a flow meter having an array of sensors.

Referring to FIG. 1, a schematic diagram illustrates an embodiment of an apparatus operable to measure parameters of a fluid flow 20 containing a mixture of particles and fluid within a pipe. The flow 20 within the pipe 22 may comprise a mixture of gas and solid particles, liquid and solid particles, or liquid, gas, and solid particles. The term "particles" as used herein refers to matter in solid state.

The present invention is shown in FIG. 1 in the context of a piping system 24 for delivering a pulverized coal/air mixture from a coal pulverizer 26 to a plurality of furnaces 28. The piping system 24 includes a discharge pipe 30 extending between the coal pulverizer 26 and a manifold 32. A plurality of furnace feed pipes 34 (i.e., an embodiment of a pipe 22) extend between the manifold 32 and a plurality of furnaces 28. This example is provided for illustrative purposes only. The present invention is not limited to this application or to a system that handles pulverized coal as the particle matter within the fluid flow 20. Other industries that utilize particle/fluid delivery systems include chemical, pharmaceutical, and petroleum industries; e.g., an oil well application wherein sand is transported within a fluid flow 20 pumped from the oil well.

Referring to FIGS. 1, 4 and 5, the apparatus includes at least one sensor 36 operable to measure the impingement of particles disposed within the fluid flow 20 on a surface (e.g., see surface 38 in FIG. 5) wetted with the fluid flow 20, and at least one flow meter 40 operable to determine the velocity of the particle/fluid flow 20 within a pipe 22.

The at least one sensor 36 can be any type of sensor (e.g., a piezoelectric sensor) having an output related to the impingement of the particles on a surface 38 wetted with the fluid flow 20. In some embodiments, the sensor 36 itself provides the surface 38 wetted with the flow 20 (which is impinged upon by the particles). In alternative embodiments, the sensor 36 may be in contact with, or in communication with, a wall of the pipe 22 or a body 42 disposed within the fluid flow 20. For example, if an elbow pipe section 22A (see FIG. 4) is included within the pipe 22, the surface 38A of the pipe 22 disposed substantially perpendicular to the incoming fluid flow vector will be impinged upon by fluid flow 20. In this example, the at least one sensor 36 can be placed in contact with the wall of the elbow section 22A aligned with the flow impingement. As another example, a body 42 can be inserted into a straight pipe section (see FIG. 5) and the at least one sensor 36 placed in contact or in communication with the body 42 in a manner such that particles impinging upon the surface 38 of the body 42 can be sensed by the sensor 36.

The output of the at least one sensor 36 is primarily based upon the velocity of the particles within the fluid flow 20, and the mass flow rate of the particles within the fluid flow 20; e.g., the magnitude of the signal produced by the sensor is a function of the velocity and mass flow rate of the particles. The at least one sensor 36 may have a dedicated signal processor, or may share a signal processor 50 with the at least flow meter 40 as is described below.

Referring to FIG. 2, the at least one flow meter 40 may be of any type that is operable to determine the velocity of the particle/fluid flow 20 within the pipe 22. In preferred embodiments, the flow meter 40 includes an array 43 of at least two ultrasonic sensor units 44. Each ultrasonic sensor unit 44 includes a pair of ultrasonic sensors 46,48, one of which functions as a transmitter (Tx) 46 and the other as a receiver (Rx) 48. The sensor units 44 are spaced axially along the outer surface of the pipe 22 having the flow 20 propagating therein.

In the embodiment shown in FIG. 2, the transmitter 46 and receiver 48 sensors of each pair 44 are diametrically disposed on the pipe 22 at predetermined locations along the pipe 22 to provide a through transmission configuration, such that the sensors 46,48 transmit and receive an ultrasonic signal that propagates through the fluid 20 substantially orthogonal to the direction of the flow of the fluid within the pipe 22. The present invention is not limited to orthogonally oriented sensors 44, however. In a first alternative embodiment, one of the ultrasonic sensors 46,48 of each sensor unit 44 may be offset axially such that the ultrasonic signal from the transmitter sensor 46 has an axial component in its propagation direction. In a second alternative embodiment, the ultrasonic sensors 46,48 may be arranged in a pulse/echo configuration, wherein each sensing unit 44 includes an ultrasonic sensor that transmits an ultrasonic signal through the pipe wall and fluid substantially orthogonal to the direction of flow and receives a reflection of the ultrasonic signal reflected back from the wall of the pipe to the ultrasonic sensor. In a third alternative embodiment, the sensors 46,48 may be configured in a pitch and catch configuration, wherein each sensor unit 44 includes a transmitter 46 and a receiver 48 disposed axially along the pipe 22 disposed on the same side of the pipe 22 at a predetermined distance apart. The transmitter 46 of each pair provides an ultrasonic signal at a predetermined angle into the flow. The ultrasonic signal propagates through the fluid 20 and reflects off the inner surface of the pipe and back through the fluid to the respective receiver 48. These sensor 44 configurations are examples of acceptable sensor configurations, and the flow meter 40 should not be construed as limited to these examples.

The sensor units 44 measure a transit time (e.g., time of flight (TOF), or phase modulation) of an ultrasonic signal propagating through the fluid 20 from the transmitting sensor 46 to the receiving sensor 48. The transit time measurement or variation is indicative of a coherent property that convects with the flow 20 within the pipe 22 (e.g., vortical disturbances, inhomogenieties within the flow, temperature variations, bubbles, particles, pressure disturbances), which convective velocity is indicative of the velocity of the flow. The ultrasonic sensors 44 may operate at a variety of different frequencies. In general, however, higher frequency sensors are more suitable for single phase fluids while lower frequency sensors are more suitable for multiphase fluids. The optimum frequency of the ultrasonic sensor 44 is dependent on the size or type of disturbance, particle, or substance propagating with the flow 20. Examples of frequency used for a flow meter 40 embodying the present invention are 1 MHz and 5 MHz. The ultrasonic sensors 44 may also provide a pulsed, chirped or continuous signal through the fluid flow 20. An example of the sensors 44 that may be used are Model no. 113-241-591, manufactured by Krautkramer.

An ultrasonic signal processor 50 fires the sensors 44 in response to a firing signal from the transmitter and receives the ultrasonic output signals $S_1(t)$-$S_N(t)$ from the sensors 44. The signal processor 50 processes the data from each of the sensor units 44 to provide an analog or digital output signal $T_1(t)$-$T_N(t)$ indicative of the time of flight (TOF; also sometimes referred to as "transit time") of the ultrasonic signal through the fluid 20. The signal processor 50 may also provide an output signal indicative of the amplitude (or attenuation) of the ultrasonic signals. One such signal processor is model no. USPC 2100 manufactured by Krautkramer Ultrasonic Systems.

The ultrasonic sensors 44 provide the transit time-varying signals $T_1(t)$, $T_2(t)$, $T_3(t)$ ... $T_N(t)$ to a signal processor to known Fast Fourier Transform (FFT) logics 54-60, respectively. The FFT logics calculate the Fourier transform of the time-based input signals $T_1(t)$-$T_N(t)$ and provide complex frequency domain (or frequency based) signals $T_1(\omega)$, $T_2(\omega)$, $T_3(\omega)$ ... $T_N(\omega)$ indicative of the frequency content of the input signals. Instead of FFT's, any other technique for obtaining the frequency domain characteristics of the signals $T_1(t)$-$T_N(t)$, may be used. The frequency signals $T_1(\omega)$-$T_N(\omega)$ are fed to an array processor 62, which provides a flow signal indicative of the volumetric flow rate of the fluid flow 20 and a velocity signal indicative of the velocity of the fluid flow 20.

One technique for determining the fluid flow velocity involves determining the convection velocity of vortical disturbances (e.g., turbulent eddies 64—see FIG. 3) convecting with the fluid flow. U.S. Pat. No. 6,609,069, entitled "Method and Apparatus for Determining the Flow Velocity Within a Pipe", which is incorporated herein by reference, provides an example of such a technique.

The convection velocity of coherent structures (e.g., turbulent eddies 64) within the fluid flow 20 is determined by applying arraying processing techniques that determine the speed at which the eddies 64 convect past an array of ultrasonic sensors 46,48 such as that described above. The array processing algorithms determine the speed of the eddies 64 by characterizing both the temporal and spatial frequency characteristics of the flow field. For a series of coherent eddies 64 convecting past a fixed array of ultrasonic sensor units 44, the temporal and spatial frequency content of pressure fluctuations are related through the following relationship:

$$k = \frac{\omega}{U_{convect}} \qquad \text{Eqn. 1}$$

Here k is the wave number or spatial frequency, defined as $k=2\pi/\lambda$ and has units of 1/length, $\omega$ is the temporal frequency in rad/sec, and $U_{convect}$ is the convection velocity. Thus, the temporal frequency, w, is linearly related to the spatial frequency, k, by the convection velocity.

Figure 6:
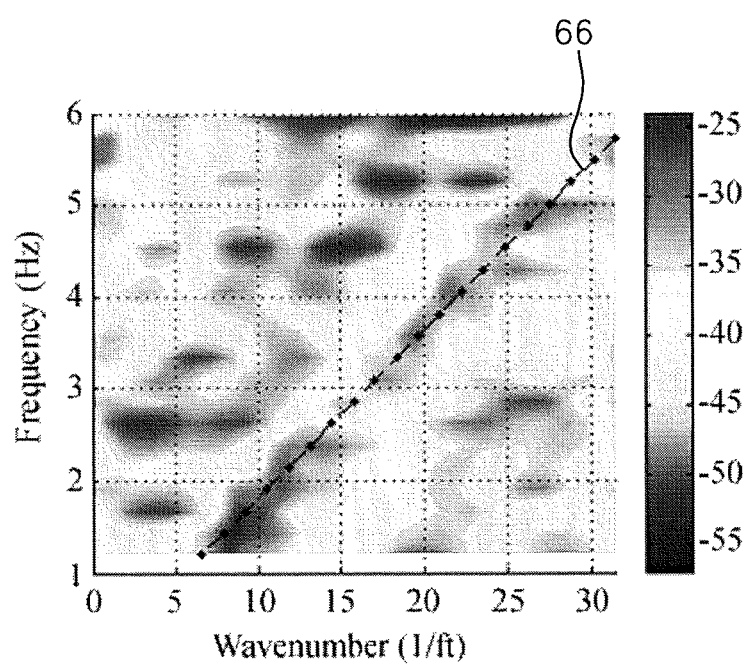
FIG. 6 is a diagrammatic k-ω plot of data, illustrating a convective ridge.

Referring to FIG. 6, in array processing, the spatial/temporal frequency content of time stationary sound fields are often displayed using "k-ω plots". K-ω plots are essentially three-dimensional power spectra in which the power of the field is decomposed into bins corresponding to specific spatial wave numbers and temporal frequencies. On a k-ω plot, the power associated with a pressure field convecting with the flow is distributed in regions, which satisfies the dispersion relationship developed above. This region is termed "the convective ridge" (Beranek, 1992) and the slope of this ridge on a k-ω plot indicates the convective velocity of the pressure field determined by measuring the variation in the TOF by each ultrasonic sensor unit. This suggests that the convective velocity of turbulent eddies, and hence flow rate within a pipe 22, can be determined by constructing a k-ω plot from the output of an array of sensors and identifying the slope of the convective ridge 66. FIG. 6 illustrates an example of a k-ω plot, including a convective ridge 66.

Figure 3:
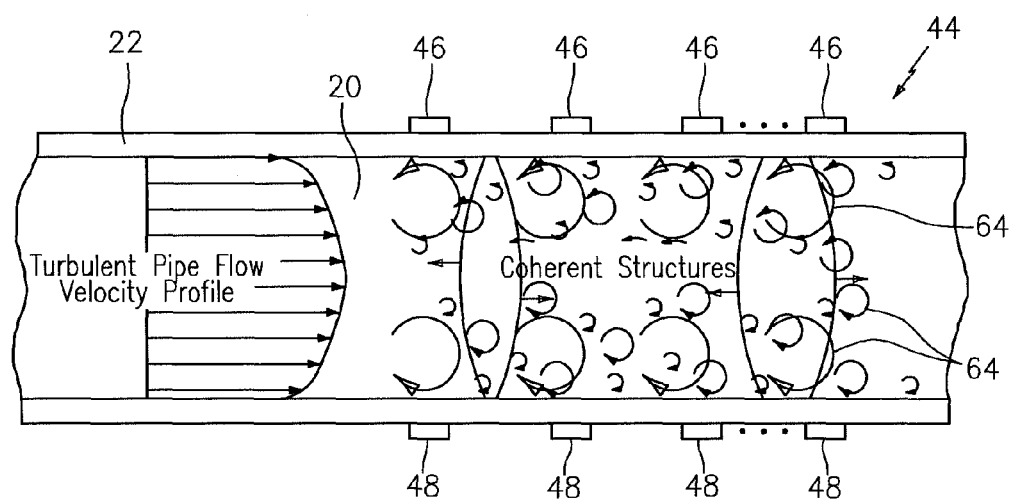
FIG. 3 is a cross-sectional view of a pipe having coherent structures therein.

Referring to FIGS. 2 and 3, the operation of the flow meter 40 shown in FIG. 2 is based on the observation that vortical disturbances 64 (see FIG. 3) within a moving fluid (and/or other characteristics of the fluid that convect with the flow, described hereinabove) vary the transit time of the ultrasonic signal, which can be sensed by ultrasonic sensors 44, and that the vortical disturbances 64 move at either the same velocity as the moving fluid, or at a velocity that can be correlated to the velocity of the moving fluid. The array processing can be performed by exploiting what is sometimes called the dispersion relationship associated with convective disturbances 64 (i.e., $\omega$=uk; see Eqn. 1 above). Convective disturbances in a flowing fluid can be viewed as disturbances that are fixed to the fluid. These disturbances have a spatial variation associated with them. Since a disturbance can be viewed as affixed to the fluid particles, the spatial variations result in temporal variations when sensed by stationary sensors. The spatial wavelength of the disturbances 64 that move with the fluid 20 is thereby linked to the temporal variations observed by the stationary sensors. Array processing techniques are used to identify the relationship between the spatial wavelength of the disturbances and the temporal variations, and thereby determine the convection velocity of the fluid 20.

Processing techniques include standard so-called beam forming, array processing, or adaptive array-processing algorithms, i.e. algorithms for processing the sensor signals using various delays and weighting to create suitable phase relationships between the signals provided by the different sensors 44, thereby creating phased antenna array functionality. In other words, the beam forming or array processing algorithms transform the time domain signals from the sensor array 43 into their spatial and temporal frequency components, i.e. into a set of wave numbers given by $k=2\pi/\lambda$ where $\lambda$ is the wavelength of a spectral component, and corresponding angular frequencies given by $\omega=2\pi v$.

Many available algorithms are operable to spatially and temporally decompose a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as the MUSIC algorithm. The present invention recognizes that such techniques can be used to determine flow rate, i.e. that the signals caused by vortical disturbances convecting with a flow are time stationary and have a coherence length long enough that it is practical to locate sensor units apart from each other and yet still be within the coherence length.

The flow meter 40 is described above in the context of a preferred embodiment utilizing ultrasonic sensors 44. The present invention is not so limited, however, and can utilize flow meter sensors that measure other parameters that convect with the flow, including strain sensors, pressure sensors, temperature sensors, magnetic sensors, capacitive sensors, inductive sensors, optical sensors, laser sensors, etc.

Operation:

As indicated above, the magnitude of the signals provided by the at least one sensor 36 is primarily based upon the velocity of the particles within the fluid flow 20, and the mass flow rate of the particles within the fluid flow 20. Regarding the determined velocity and as indicated above, the velocity determined by the flow meter 40 is the velocity of a coherent property (e.g., vortical disturbances, etc.) that convects with the flow 20 within the pipe 22. If the fluid flow is a single phase flow and there is no slippage between the coherent property and the fluid 20, then the velocity of the coherent property and the fluid are the same. If the fluid flow 20 is a multi-phase flow and there is slippage between the phases and/or between the coherent properties convecting with the flow, the flow meter determined velocity will be indicative of the velocity of the flow. The exact relationship between the velocities of the fluid flow components can be considered in terms of superficial velocities:

$$V_{Mix}=V_{Sgas}+V_{Swater}+V_{Soil}+V_{Sparticle}$$

The exact relationship between the velocities can be determined analytically if necessary. In many instances, however, it is sufficient to empirically determine the relationship between the flow meter determined velocity and the particle mass flow rate. With the knowledge of that relationship, the determined velocity can be used to determine the particle mass flow rate for a given application.

Figure 7:
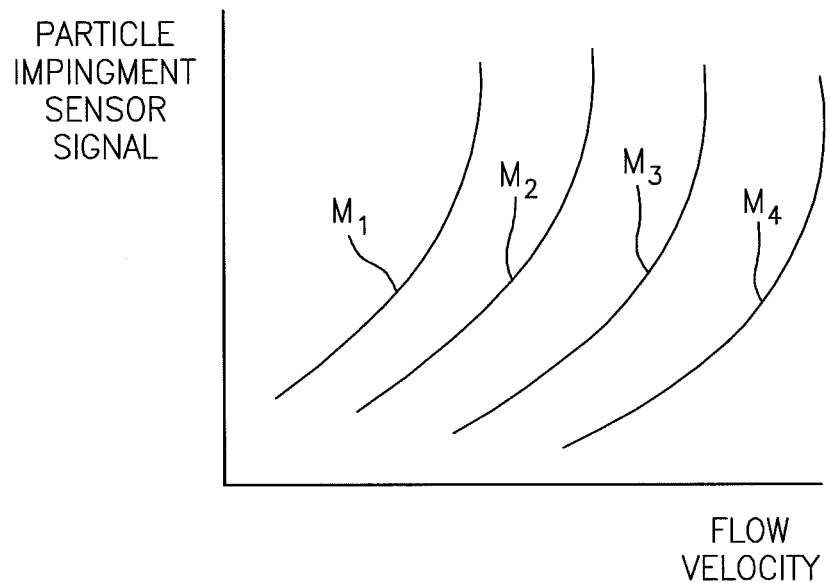
FIG. 7 is a diagrammatic plot of particle impingement sensor signal versus flow velocity, for constant particle mass flow rates.
Figure 8:
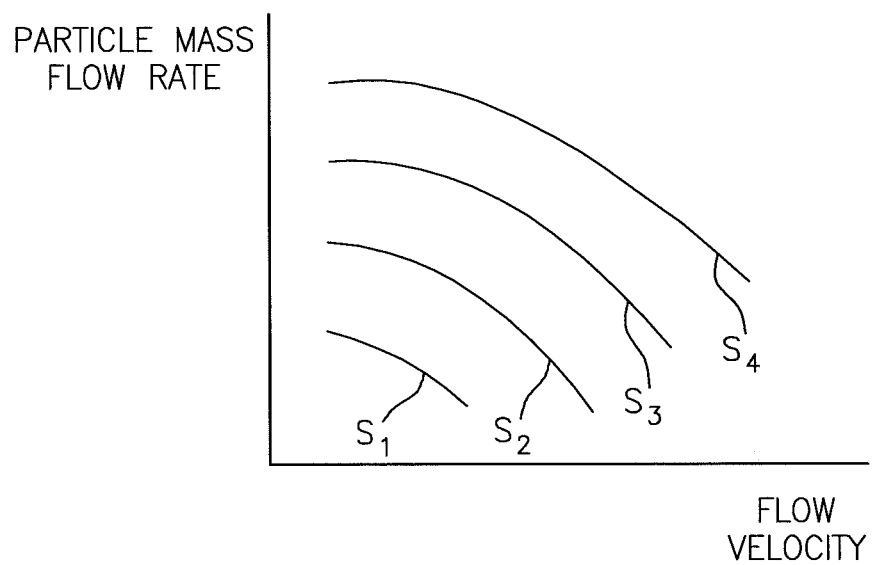
FIG. 8 is a diagrammatic plot of particle mass flow rate versus flow velocity, for constant particle impingement sensor signal magnitudes.

Referring to FIGS. 1, 7 and 8, variations in the magnitude of the signal from the at least one sensor 36 can be normalized with respect to velocity. The sensor 36 signal normalized for changes in velocity can then be directly correlated to changes in the particle mass flow rate. An increase in the particle mass flow rate within the fluid flow 20 at a constant velocity, will cause a change (e.g., an increase) in the magnitude of the signal produced by the at least one sensor 36.

FIGS. 7 and 8 illustrate two different graphical embodiments of the relationship between the particle mass flow rate, the sensor signal magnitude (e.g., the signal from sensor 36 shown in FIG. 1), and the determined flow velocity. FIG. 7 graphically illustrates sensor 36 signal magnitude versus flow velocity. The diagrammatic lines (m1, m2, m3, m4) depicted in the graph are lines of constant particle mass flow rate within the fluid flow. These lines are shown for diagrammatic illustration only and do not reflect actual data, which data would vary depending on the application specifics. FIG. 8 graphically illustrates particle mass flow rate versus flow velocity. The diagrammatic lines depicted in the graph are lines of constant sensor signal (s1, S2, S3, S4); i.e., for a particular sensor signal the relationship between the particle mass flow rate and the flow velocity is shown. Here again, these lines are for illustrative purposes only and do not reflect actual data, which data would vary depending on the application specifics.

The present invention system can be calibrated for a particular application by introducing a known amount of particle mass within the fluid flow 20 and sensing the fluid flow 20 for the particle mass impact on the pipe wall surface 22A or body 42 (see FIGS. 4 and 5), at a determined constant velocity. The process can be repeated for numerous known amounts of particle mass introduced into the fluid flow 20 at the constant velocity. The relationship between the sensor 36 signal, the particle mass flow rate, and the fluid flow velocity for a given system can then be represented mathematically, graphically, or in tabular form for subsequent use. In some applications (or as a verification process), the particle mass flow rate can be held constant and the fluid flow velocity can be incrementally changed, and the data collected.

Thus, in a system including the combination of a velocity meter 40, and a sensor 36 for providing an output related to the impact of particles on a pipe wall surface 22A or body 42, outputs of the system may include the velocity of the particle-fluid flow 20 (e.g., coal particles/air), and the mass flow rate of the particles within the particle/fluid flow 20.

In the context of an application where the particle matter is coal within a coil/air fluid flow 20, the performance of the sensing system may be further enhanced by employing the system on all the coal pipes 34 installed on the outlet of a pulverizer 26. A pulverizer 26 is used to grind larger pieces of coal into particles of a size that may be conveyed through pipes 34 by entrainment of the coal particles in an air stream. A single pulverizer 26 may be used to feed one or more pipes 34 attached to a furnace 28. Typically, the total amount of coal (by weight/mass) and the volumetric flow of air input to the pulverizer 26 are measured. Thus, the combined coal and air rate through all the coal pipes 34 attached to the single pulverizer 26 is known. By combining the known total coal and air rate through the pipes 34 with the output of the system described above the complexity of the measurement problem is reduced since the system described above is only required to provide a measure of the deviation in coal flow in each pipe from the average coal flow (which is known).

The system performance may be further improved by adding a long aperture array speed of sound (SOS) measurement device onto one or all pipes 22 and using this information to solve for particle size while constraining each pipe's fluid to particle ratio to the value determined by the system described above. A long aperture array SOS measurement such as that described in commonly owned U.S. Pat. No. 7,275,421, which is hereby incorporated in its entirety, is an example of an acceptable long aperture array speed of sound (SOS) measurement device.

The method of the invention may be practiced at least in part utilizing computer or controller implemented processes. The invention may alternatively be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for determining at least one flow parameter of a fluid flowing within a pipe, which fluid contains particles entrained within the fluid flow, the method comprising the steps of:
   determining a velocity of the fluid flow within the pipe;
   sensing impingement of particles on a surface wetted with the fluid flow, and producing a signal relating to the impingement; and
   using a processor to determine the at least one flow parameter of the fluid flow utilizing the determined fluid flow velocity and the sensor signal relating to impingement of the particles on the surface wetted with the fluid flow.

2. The method of claim 1, wherein the velocity is determined by determining the time of flight of a plurality of signals through the fluid flow.

3. The method of claim 2, wherein the velocity is determined using ultrasonic sensors.

4. The method of claim 2, wherein the velocity is determined using a meter that includes a spatial array of at least two sensors, with each sensor in the array disposed at an axial position along the pipe different than the axial positions of the other sensor or sensors, which meter produces an output related to the velocity of the fluid flow.

5. The method of claim 4, further comprising the step of normalizing the sensor signal with respect to velocity.

6. The method of claim 5, further comprising the step of determining a relationship between a magnitude of the sensor signal, the velocity of the flow, and particle mass flow rate for the flow, and using that relationship to determine a specific particle mass flow rate for a given flow velocity.

7. The method of claim 4, wherein the wherein the impingement is sensed using at least one strain sensor.

8. The method of claim 7, wherein the at least one strain sensor is attached to a pipe wall.

9. The method of claim 8, wherein the at least one strain sensor is operable to sense the particles impinging against a body disposed within the fluid flow.

10. A system for determining at least one parameter of a fluid flow containing particles entrained within the flow, which flow is disposed within a pipe, the system comprising:
   at least one meter operable to determine the velocity of the fluid flow within the pipe, which meter includes a spatial array of at least two sensors, with each sensor in the array disposed at an axial position along the pipe different than the axial positions of the other sensor or sensors, which meter produces an output related to the velocity of the fluid flow;

at least one sensor operable to produce a signal relating to the entrained particles impinging on a surface wetted with the fluid flow; and a processor operable to selectively determine the at least one parameter of the fluid flow utilizing the meter output and the sensor signal relating to the particles impinging on the surface wetted with the fluid flow.

11. The system of claim 10, wherein the meter is operable to determine the velocity by determining the time of flight of a plurality of signals through the fluid flow.

12. The system of claim 11, wherein the meter includes ultrasonic sensors.

13. The system of claim 10, wherein the processor is operable to normalize the sensor signal with respect to velocity.

14. The system of claim 13, wherein the processor is operable to determine a specific particle mass flow rate for a given determined flow velocity, using a relationship between a magnitude of the sensor signal, the determined velocity of the flow, and predetermined particle mass flow rates for the fluid flow.

15. The system of claim 10, wherein the at least one sensor is a strain-type sensor.

16. The system of claim 15, wherein the at least one sensor is attached to a pipe wall.

17. The system of claim 15, wherein the at least one strain sensor is in communication with a body disposed within the fluid flow, and operable to sense particles impinging the body.

* * * * *